United States Patent
Kim

(10) Patent No.: US 12,549,958 B2
(45) Date of Patent: Feb. 10, 2026

(54) METHOD AND APPARATUS FOR SHARING FREQUENCY BETWEEN BASE STATIONS SUPPORTING VARIOUS QOS REQUIREMENTS

(71) Applicant: ELECTRONICS AND TELECOMMUNICATIONS RESEARCH INSTITUTE, Daejeon (KR)

(72) Inventor: Tae Joong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 573 days.

(21) Appl. No.: 18/079,671

(22) Filed: Dec. 12, 2022

(65) Prior Publication Data

US 2023/0247439 A1    Aug. 3, 2023

(51) Int. Cl.
*H04W 16/14* (2009.01)
*H04W 72/0457* (2023.01)
*H04W 72/54* (2023.01)

(52) U.S. Cl.
CPC ....... *H04W 16/14* (2013.01); *H04W 72/0457* (2023.01); *H04W 72/54* (2023.01)

(58) Field of Classification Search
CPC .................................................. H04W 16/14
See application file for complete search history.

(56) References Cited

U.S. PATENT DOCUMENTS

| | | | |
|---|---|---|---|
| 9,887,748 B2 | 2/2018 | Wang | |
| 10,236,933 B2 | 3/2019 | Chen et al. | |
| 11,019,502 B2 * | 5/2021 | Sevindik | H04W 16/14 |
| 2010/0216486 A1 * | 8/2010 | Kwon | H04W 72/27 455/452.2 |
| 2012/0238273 A1 * | 9/2012 | Lim | H04W 16/04 455/436 |
| 2014/0308968 A1 * | 10/2014 | Xiao | H04W 72/27 455/452.1 |

(Continued)

FOREIGN PATENT DOCUMENTS

| | | | |
|---|---|---|---|
| EP | 3713333 A1 | 9/2020 | |
| WO | WO-2014023358 A1 * | 2/2014 | ............ H04W 72/27 |

OTHER PUBLICATIONS

Fuad Abinader et al., "Impact of Bandwidth Park (BWP) Switching on 5G NR System Performance", 2019 IEEE 2nd 5G World Forum (5GWF), Sep. 2019, pp. 1-6.

*Primary Examiner* — Jamaal Henson
(74) *Attorney, Agent, or Firm* — Rabin & Berdo, P.C.

(57) ABSTRACT

A method of sharing a frequency between base stations, which is performed by a specialized base station having at least some specialized coverages inside a general purpose coverage of a general purpose base station, may comprise: receiving information about adjacent base stations including the general base station from a mobile edge core network configured to manage the specialized base station; requesting, by the specialized base station, necessary bandwidth parts from the mobile edge core network; receiving allocation information for the bandwidth parts from the mobile edge core network; and setting the bandwidth parts based on the allocation information, wherein the specialized base station provides a specialized service to a specialized terminal in the specialized coverage according to the set bandwidth parts.

15 Claims, 7 Drawing Sheets

(56) References Cited

U.S. PATENT DOCUMENTS

| | | | |
|---|---|---|---|
| 2017/0257774 A1* | 9/2017 | Ghosh .................. | H04W 16/14 |
| 2017/0279578 A1 | 9/2017 | Boudreau et al. | |
| 2019/0141734 A1 | 5/2019 | Lei et al. | |
| 2020/0235877 A1 | 7/2020 | Manolakos et al. | |
| 2020/0236677 A1* | 7/2020 | Cui .................. | H04W 72/1268 |
| 2020/0245153 A1* | 7/2020 | Jones .................. | H04W 12/08 |
| 2021/0288750 A1 | 9/2021 | Chen et al. | |

* cited by examiner

METHOD AND APPARATUS FOR SHARING FREQUENCY BETWEEN BASE STATIONS SUPPORTING VARIOUS QOS REQUIREMENTS

CROSS-REFERENCE TO RELATED APPLICATIONS

This application claims priority to Korean Patent Application No. 10-2022-0013957, filed on Feb. 3, 2022, with the Korean Intellectual Property Office (KIPO), the entire contents of which are hereby incorporated by reference.

BACKGROUND

1. Technical Field

Example embodiments of the present disclosure relate to a method and an apparatus for suppressing interference between a plurality of base stations having different requirements to ensure quality of service of the base station in wireless communication, and more particularly, to a method and an apparatus for sharing a frequency between base stations in which, in a frequency-band-sharing network between coverages, a specialized base station shares information about a bandwidth part (BWP) required in the corresponding specialized coverage with a mobile edge core network so that a supported BWP is allowed to be continuously changed if necessary.

2. Related Art

In 2016, the International Telecommunication Union's Radiocommunication Sector (hereinafter referred to as ITU-R) announced the vision and requirements of $5^{th}$ generation mobile communication and requested the development of standards for practically providing various services through three core services unlike $4^{th}$ generation mobile communication.

The three core services include an enhanced mobile broadband (eMBB) service that provides high-speed data, an ultra-high reliable and low latency communication (URLLC) service, and a massive Internet-of-Things (IoT) (mMTC) service, and requirements are individually defined for each service.

The ITU-R specified the three core services in order to prepare standards for the convergence between numerous other industries and mobile communication that will emerge in the $5^{th}$ generation mobile communication era.

In order to realize this, in the $3^{rd}$ Generation Partnership Project (3GPP), a function capable of realizing network slicing based on software defined networking (SDN)/network function virtualization (NFV) has been reflected in a core network standard to lay a foundation for providing various services in a mobile communication network.

In addition, in order to realize requirements such as low latency, a mobile edge core network structure, in which a core network is adjacent to a radio access network (RAN) base station, has been reflected. However, such a function is limited to a core network and is not reflected in an RAN, and thus it is impossible to practically provide end-to-end slicing required by users.

FIG. 1 illustrates an example of a scenario of constructing a network in which a general purpose network and a specialized network overlap each other to provide a specific service in $5^{th}$ generation mobile communication. The general purpose network in FIG. 1 includes a general purpose terminal 11 which is present in a general purpose coverage 10 and receives a general purpose service, at least one general purpose base station 12 which manages the general purpose coverage 10 and provides a wireless connection with at least one general purpose terminal 11, a core network 40 which is connected to the general purpose base station 12 through a wired/wireless backhaul link 13 made of an optical cable or the like to control the general purpose base station 12, processes data input from the outside to transmit the processed data to the general purpose base station 12, and appropriately processes data output from the general purpose base station 12 to transmit the processed data to internal and external networks, an external network 50 which is connected to the core network 40 and an application service data center 60 to provide an application service of the application service data center 60 to the core network 40, and the like.

Meanwhile, the specialized network is a network that serves a specific purpose or provides a specialized service for managing a specific area and includes a specialized terminal 21 which is present in a specialized coverage 20 and receives a specialized service, a specialized base station 22 which manages the specialized coverage 20 and provides a wireless connection with at least one specialized terminal 21 in the specialized coverage 20, and a mobile edge core network 30 which is present in the same space as the specialized base station 22 to be connected to the specialized base station 22 or is connected to the specialized base station 22 through a wired/wireless backhaul link 23 made of a cable or the like to control the specialized base station 22 and provide a specialized service.

Of course, in order to provide a general purpose service that cannot be provided by the specialized network by itself, the mobile edge core network 30 may be connected to the application service data center 60 or the like through the core network 40 connected through a backhaul 31 or the external network 50 connected through a backhaul 32.

In such a configuration, as in a general purpose network path 14 of FIG. 1, a general purpose service is provided through a data flow between the general purpose terminal 11, the general purpose base station 12, the core network 40, the external network 50, and the application service data center 60.

In addition, as in a specialized network path 24 of FIG. 1, a specialized service is provided through a data flow between the specialized terminal 21, the specialized base station 22, and the mobile edge core network 30. The specialized network path 24 has advantages that it is capable of providing data security and data speed, and the like and thus has started to be applied in $4^{th}$ generation mobile communication and is being widely used for a specific purpose or a specialized service for managing a specific area in the $5^{th}$ generation mobile communication era.

However, as shown in FIG. 1, when the general purpose coverage 10 for a general purpose service and the specialized coverage 20 for a specialized service use the same frequency band, mutual radio interference occurs. In particular, since the specialized coverage 20 is not constructed according to a cell construction plan for resolving a shadow area but is additionally constructed for a special service, in the case of regional overlapping, mutual radio interference cannot be avoided.

In this case, it is difficult to secure quality of service (QoS) strictly required for a specialized service. In order to solve the problem of securing QoS in the specialized coverage 20, a method of dividing a used frequency band in the general purpose coverage 10 and a used frequency band in the specialized coverage 20 is possible.

That is, the general purpose base station 12 provides a service using a general purpose frequency band, and the specialized base station 22 provides a service using a specialized frequency band. In this case, it is possible to remove radio interference between coverages due to orthogonality between frequency bands, and it is possible to solve the problem of securing QoS in the specialized coverage 20.

FIG. 2 illustrates a configuration in which frequencies used in the general purpose coverage 10 and the specialized coverage 20 are divided into bandwidth parts to remove radio interference between the coverages in the scenario of constructing the network in which the general purpose network and the specialized network overlap each other shown in FIG. 1.

As shown in FIG. 2, in the specialized coverage 20 (coverage-2), bandwidth part #1 20-1 and bandwidth part #2 20-2 are provided to a specialized terminal for a specialized service, and in the general purpose coverage 10 (coverage-1), the remaining bandwidth part #3 10-1 to bandwidth part #N 10-2 are provided to a general purpose terminal. Thus, by managing the coverages such that there is no radio interference between terminals in each coverage, QoS of the coverage, in particular, QoS of the specialized coverage is guaranteed.

However, in the above-described method of dividing frequency bands, frequency use efficiency is very low according to a configuration of terminals in each coverage. In particular, there is a problem in that unnecessary signaling and traffic overhead are generated in order to change a bandwidth division method when terminals move between coverages.

There is a need for a method of solving the frequency inefficiency of a frequency band division method and securing QoS between coverages in such a scenario of constructing a network in which a general purpose network and a specialized network overlap each other.

SUMMARY

Accordingly, example embodiments of the present disclosure are provided to substantially obviate one or more problems due to limitations and disadvantages of the related art.

Example embodiments of the present disclosure provide a method and an apparatus for sharing a frequency between base stations in which, in wireless communication, quality of service is guaranteed by resolving the inefficiency of frequency use between a plurality of base stations with different requirements and suppressing interference between the base stations.

Example embodiments of the present disclosure also provide a method and an apparatus for sharing a frequency between base stations in which, in a frequency-band-sharing network between coverages, a specialized base station shares information about a bandwidth part required in the specialized coverage with a mobile edge core network so that a supported bandwidth part is allowed to be continuously changed when necessary.

Example embodiments of the present disclosure also provide a method and an apparatus for sharing a frequency between base stations in which, in a frequency-band-sharing network between coverages, a specialized base station is connected to an adjacent general purpose base station in a wired or wireless manner to share bandwidth part use information of a corresponding base station in real time and has a function of preparing to avoid frequency band overlapping.

Example embodiments of the present disclosure also provide a method and an apparatus for sharing a frequency between base stations in which, in a frequency-band-sharing network between coverages, a specialized base station receives radio signals transmitted from adjacent general purpose and specialized base stations, measures a received signal level, a propagation path loss, a signal-to-noise ratio, or the like, and shares a measured result with a mobile edge core network to allow the measured result to be used as information for determining an optimal bandwidth part to be used in a general purpose coverage and a specialized coverage.

Example embodiments of the present disclosure also provide a method and an apparatus for sharing a frequency between base stations, in which, in a frequency-band-sharing network between coverages, a mobile edge core network has a function of selecting a bandwidth part used in each base station to optimize quality of service of a general purpose base station and a specialized base station in cooperation with a core network.

According to a first exemplary embodiment of the present disclosure, a method of sharing a frequency between base stations, which is performed by a specialized base station having at least some specialized coverages inside a general purpose coverage of a general purpose base station, may comprise: receiving information about adjacent base stations including the general base station from a mobile edge core network configured to manage the specialized base station; requesting, by the specialized base station, necessary bandwidth parts from the mobile edge core network; receiving allocation information for the bandwidth parts from the mobile edge core network; and setting the bandwidth parts based on the allocation information, wherein the specialized base station provides a specialized service to a specialized terminal in the specialized coverage according to the set bandwidth parts.

The method may further comprise receiving signals transmitted from the adjacent base stations and reporting at least one of a propagation path loss, a received signal strength indicator (RSSI), reference signal received power (RSRP), reference signal received quality (RSRQ), a signal-to-interface-plus-noise ratio (SINR), and a channel quality indicator (CQI), which are measured for each bandwidth part unit, to the mobile edge core network.

When it is determined that a signal measurement level measured in the specialized base station is not a level at which a signal to be transmitted from the specialized base station causes radio interference with the adjacent base stations in all bandwidth part units, the allocation information for the bandwidth parts may include information for allowing all the bandwidth parts to be used.

When it is determined that a signal measurement level measured in the specialized base station is not a level at which a signal to be transmitted from the specialized base station causes radio interference with the adjacent base stations in a specific bandwidth part, the allocation information for the bandwidth parts may include information about the specific bandwidth part shared by the specialized base station and the general purpose base station.

The method may further comprise determining whether an update of the bandwidth part is required based on signal measurement values measured by the specialized base station, wherein, when the update of the bandwidth part is not required, a process returns to measuring signals of the adjacent base stations.

The method may further comprise determining whether an update of the bandwidth part is required based on signal measurement values measured by the specialized base station, wherein, when the update of the bandwidth part is required, a process returns to the requesting of the necessary bandwidth part.

According to a second exemplary embodiment of the present disclosure, a method of sharing a frequency between base stations, which is performed by a mobile edge core network configured to manage a specialized base station having at least some specialized coverages inside a general purpose coverage of a general purpose base station, may comprise: transmitting information about adjacent base stations including the general purpose base station to the specialized base station connected for a specialized service; receiving a message for requesting necessary bandwidth parts from the specialized base station; and transmitting allocation information for the bandwidth parts of the specialized base station and the general purpose base station to the specialized base station, wherein the specialized base station sets the bandwidth parts based on the allocation information for the bandwidth parts received from the mobile edge core network and provides a specialized service to a specialized terminal in the specialized coverage according to the set bandwidth parts.

The method may further comprise receiving signals transmitted from the adjacent base stations and receiving a report of at least one of a propagation path loss, a received signal strength indicator (RSSI), reference signal received power (RSRP), reference signal received quality (RSRQ), a signal-to-interface-plus-noise ratio (SINR), and a channel quality indicator (CQI), which are measured for each bandwidth part unit, from the specialized base station.

When it is determined that a level of a signal to be transmitted from the specialized base station is not a level which causes radio interference with the adjacent base stations in all bandwidth part units based on measurement information acquired in the receiving of the report, the allocation information for the bandwidth parts may include information for allowing all the bandwidth parts to be used.

When it is determined that a level of a signal to be transmitted from the specialized base station is not a level which causes radio interference with the adjacent base stations in a specific bandwidth part based on measurement information acquired in the receiving of the report, the allocation information for the bandwidth parts may include information about the specific bandwidth part shared by the specialized base station and the general purpose base station.

According to a third exemplary embodiment of the present disclosure, an apparatus for sharing a frequency between base stations, which is mounted on or coupled to a specialized base station having at least some specialized coverages inside a general purpose coverage of a general purpose base station to perform a method of sharing a frequency between base stations, may comprise: a processor; and a memory configured to store a program command executed by the processor, wherein, when the program command is executed by the processor, the program command is executed such that the processor performs: receiving information about adjacent base stations including the general base station from a mobile edge core network configured to manage the specialized base station; requesting, by the specialized base station, necessary bandwidth parts from the mobile edge core network; receiving allocation information for the bandwidth parts from the mobile edge core network; and setting the bandwidth parts based on the allocation information, wherein the specialized base station provides a specialized service to a specialized terminal in the specialized coverage according to the set bandwidth parts.

The processor may further perform receiving signals transmitted from the adjacent base stations and reporting at least one of a propagation path loss, a received signal strength indicator (RSSI), reference signal received power (RSRP), reference signal received quality (RSRQ), a signal-to-interface-plus-noise ratio (SINR), and a channel quality indicator (CQI), which are measured for each bandwidth part unit, to the mobile edge core network.

The processor may further perform determining whether an update of the bandwidth part is required based on signal measurement values measured by the specialized base station; and when the update of the bandwidth part is not required, the processor returns to measuring signals of the adjacent base stations.

The processor may further perform determining whether an update of the bandwidth part is required based on signal measurement values measured by the specialized base station; and when the update of the bandwidth part is required, the processor returns to the requesting of the necessary bandwidth parts.

The mobile edge core network may include a network connected to a core network configured to manage the general purpose base station.

As described above, according to the present disclosure, information about a bandwidth part required in a specialized coverage is shared and is allowed to be continuously changed as needed, thereby removing radio interference between a general purpose coverage and a specialized coverage and increasing the use efficiency of frequencies used in the general purpose coverage and the specialized coverage.

In addition, according to the present disclosure, in frequency band sharing between coverages, a specialized base station that manages a specialized coverage shares signal levels of adjacent specialized and general purpose base stations, and based on the shared signal levels, a bandwidth part to be used in a general purpose coverage and the specialized coverage is allowed to be optimally selected, thereby removing radio interference between the general purpose coverage and the specialized coverage and increasing the use efficiency of frequencies used in the general purpose coverage and the specialized coverage.

Furthermore, according to the present disclosure, in order to share a frequency band between overlapping coverages, when a base station is initially constructed and is reconstructed according to an environmental change, bandwidth part requirements required in a specialized coverage and signal levels of adjacent base stations are shared to enable a frequency band to be shared, thereby removing radio interference between a general purpose coverage and the specialized coverage and increasing the use efficiency of frequencies used in the general purpose coverage and the specialized coverage.

DETAILED DESCRIPTION OF THE EMBODIMENTS

Figure 1:
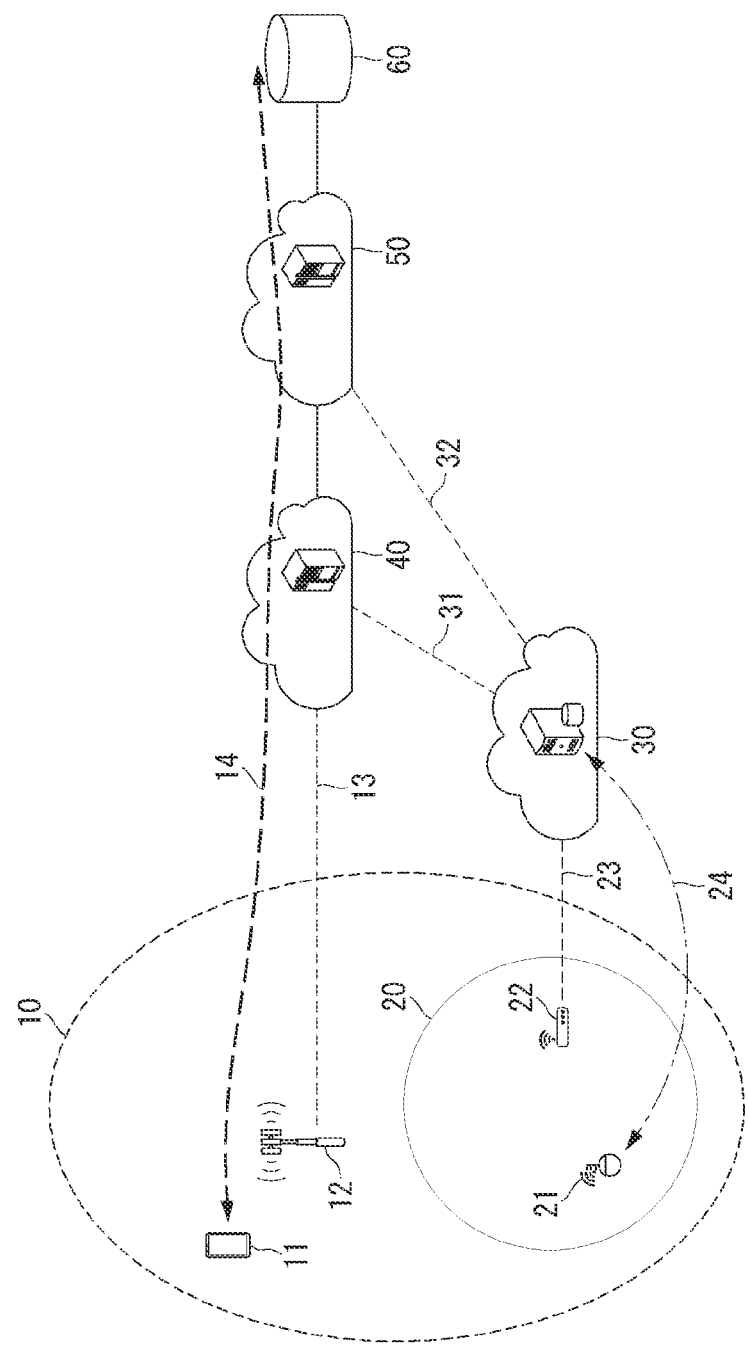
FIG. 1 illustrates an example of a scenario of constructing a network in which a general purpose network and a specialized network overlap each other to provide a specific service in $5^{th}$ generation mobile communication.
Figure 2:
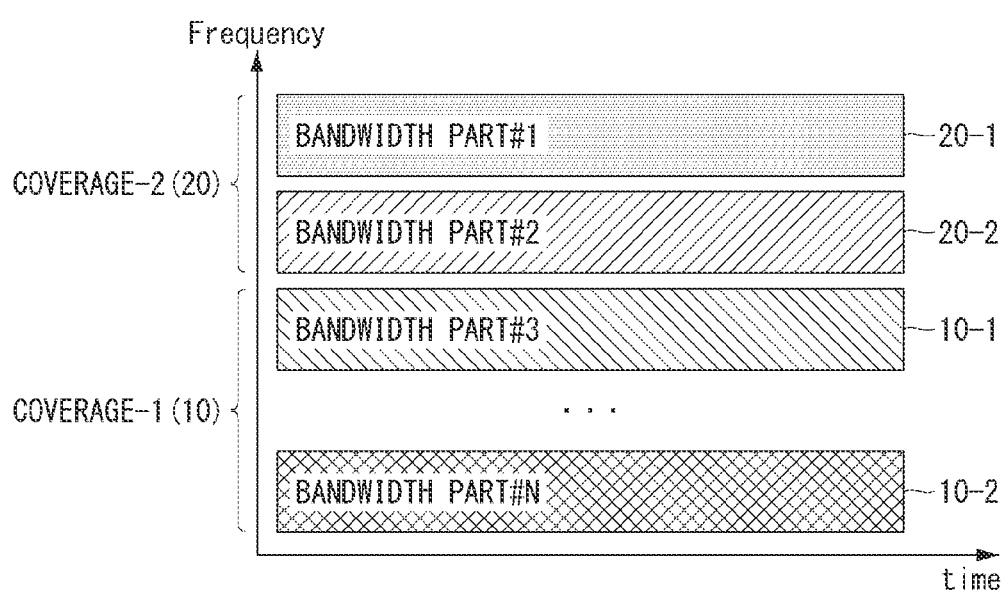
FIG. 2 illustrates a configuration in which frequencies used in the general purpose coverage 10 and the specialized coverage 20 are divided into bandwidth parts to remove radio interference between the coverages in the scenario of constructing the network in which the general purpose network and the specialized network overlap each other shown in FIG. 1.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

Figure 3:
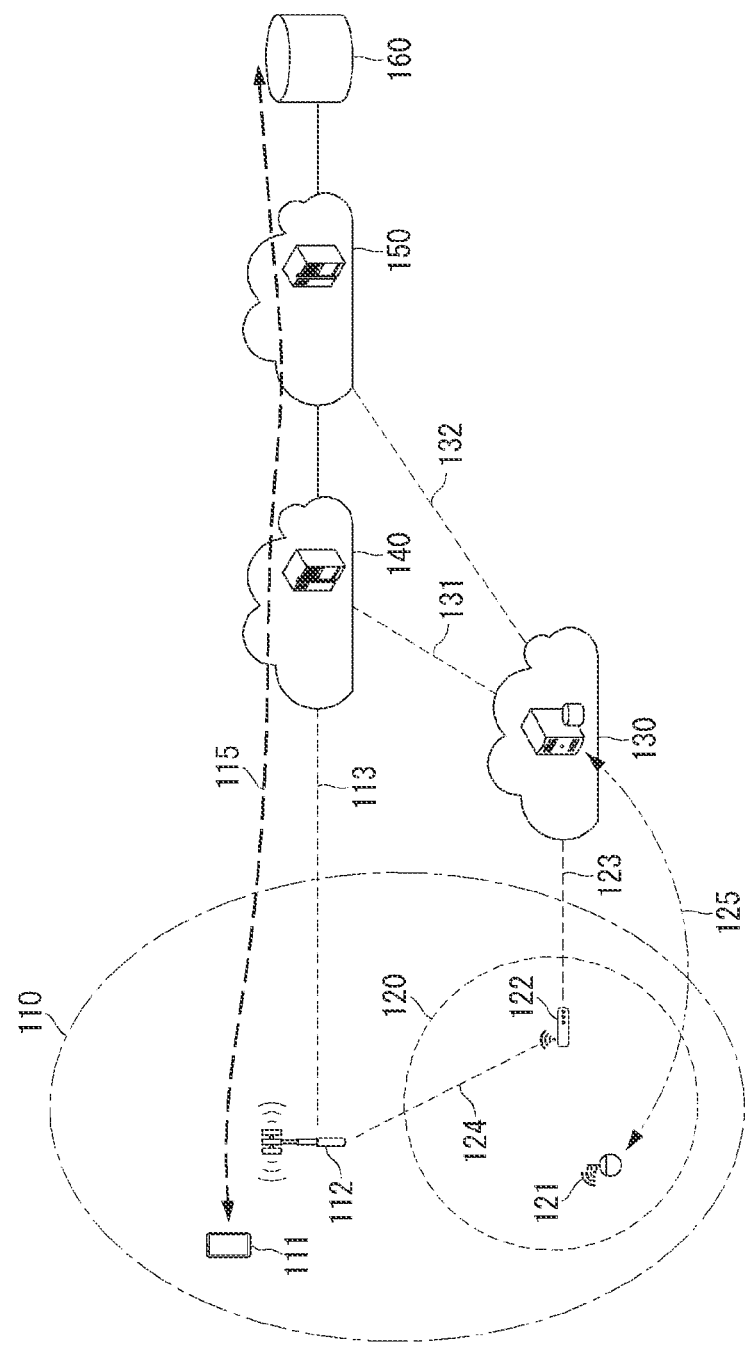
FIG. 3 is an exemplary diagram of a scenario of constructing an overlapping network between a general purpose network and a specialized network which are capable of adopting a method of sharing a frequency between base stations according to one example embodiment of the present disclosure.

FIG. 3 is an exemplary diagram of a scenario of constructing an overlapping network between a general purpose network and a specialized network which are capable of adopting a method of sharing a frequency between base stations according to one example embodiment of the present disclosure.

Referring to FIG. 3, an overlapping network apparatus for the general purpose network and the specialized network may be a type of an apparatus for sharing a frequency between base stations, which implements a method of sharing a frequency between base stations. The overlapping network apparatus may be applied for a specific purpose or a specialized service for managing a specific area in a frequency-band-sharing network between coverages. The overlapping network may be included in or coupled to a general purpose base station 112, a specialized base station 122, a mobile edge core network 130, a core network 140, or a combination thereof.

In the above overlapping network, the general purpose network includes a general purpose terminal 111 which is present in a general purpose coverage 110 and receives a general purpose service, at least one general purpose base station 112 which manages the general purpose coverage 110 and provides a wireless connection with at least one general purpose terminal 111, a core network 140 which is connected to the general purpose base station 112 through a wired/wireless backhaul link 113 made of an optical cable or the like to control the general purpose base station 112, processes data input from the outside to transmit the processed data to the general purpose base station 112, and appropriately processes data output from the general purpose base station 112 to transmit the processed data to internal and external networks, and an external network 150 which is connected to the core network 140, an application service data center 160, and the like to provide an application service of the application service data center 160 to the core network 140.

In the above overlapping network, the specialized network includes a specialized terminal 121 which is present in a specialized coverage 120 and receives a specialized service, a specialized base station 122 which manages the specialized coverage 120 and provides a wireless connection with at least one specialized terminal 121 in the specialized coverage 120, and a mobile edge core network 130 which is present in the same space as the specialized base station 122 to be connected to the specialized base station 122 or is connected to the specialized base station 122 through a wired/wireless backhaul link 123 made of a cable or the like to control the specialized base station 122 and provide a corresponding specialized service.

In order to provide a general purpose service that cannot be provided by the specialized network by itself, the mobile edge core network 130 may be connected to the external network 150 through the core network 140 connected through a backhaul 131 or may be connected directly to the external network 150 connected through a backhaul 132 to provide the general purpose service to the general purpose terminal 111 or the specialized terminal 121 through the application service data center 160 or the like.

A general purpose network path 115 for providing a general purpose service to the general purpose terminal 111 allows data to flow between the general purpose terminal 111, the general purpose base station 112, the core network 140, the external network 150, and the application service data center 160.

In addition, a specialized network path 125 for providing a specialized service to the specialized terminal 121 or for allowing the specialized terminal 121 to use the specialized service allows data to flow between the specialized terminal 121, the specialized base station 122, the mobile edge core network 130, the external network 150, and the application service data center 160. The specialized network path 125 has advantages in terms of data security, data speed, and the like and thus is expected to be widely used for a specific purpose or a specialized service for managing a specific region from the $4^{th}$ generation mobile communication era to the $5^{th}$ generation (5G) mobile communication era, and on to the $6^{th}$ generation (6G) mobile communication era.

In particular, in order to construct a frequency-band-sharing network between coverages, the specialized base station 122 may share information about a bandwidth part required in the corresponding specialized coverage 120 with the mobile edge core network 130, and thus when there is a need to avoid frequency band overlapping between coverages, it is possible to continuously request an update of a bandwidth part supported by the specialized coverage 120 to change the bandwidth part.

In addition, the specialized base station 122 may be connected to the adjacent general purpose base station 112 and other specialized base stations (not shown) in the general purpose coverage 110 through a wired or wireless internal link 124 in the general purpose coverage 110 to share frequency use information of each base station in real time. Thus, the specialized base station 122 may have a function of avoiding overlapping of frequency bands. Such a function may be referred to as a preparing function.

In addition, the specialized base station 122 may receive radio signals transmitted from the adjacent general purpose base station 112 and other specialized base stations to measure a received signal level, a propagation path loss, a signal-to-interface-plus-noise ratio, channel quality, or the like for each bandwidth part unit and may share allocation information for a bandwidth part with the mobile edge core network 130 based on a measured result. Thus, the allocation information may be used as information for determining an optimal bandwidth part to be used in a general purpose coverage and a specialized coverage.

The mobile edge core network 130 may have a function of selecting a bandwidth part used by each base station to optimize quality of service of the general purpose base station 112 and the specialized base station 122 in cooperation with the core network 140.

In the present example embodiment, each of the general purpose base station 112 and the specialized base station 122 may form a macro cell or a small cell. In addition, the general purpose base station 112 may form a macro cell, and the specialized base station 122 may form a small cell. Here, each of the base stations 112 and 122 may be referred to as a NodeB (NB), an evolved NodeB (eNB), a gNB, an advanced base station (ABS), a high reliability base station (HR-BS), a base transceiver station (BTS), a radio base station, a radio transceiver, an access point, an access node, a radio access station (RAS), a mobile multihop relay base station (MMR-BS), a relay station (RS), an advanced relay station (ARS), a high reliability relay station (HR-RS), a home NodeB (HNB), a home eNodeB (HeNB), a road side unit (RSU), a radio remote head (RRH), a transmission point (TP), or a transmission and reception point (TRP).

Each of the general purpose terminal 111 and the specialized terminal 121 may be referred to as user equipment (UE), terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, or an on-board unit (OBU).

In addition, each of the base stations 112 and 122 may support multiple-input-multiple-output (MIMO) (for example, single user (SU)-MIMO, multi user (MU)-MIMO, or massive MIMO), coordinated multipoint (CoMP) transmission, carrier aggregation (CA) transmission, transmission in an unlicensed band, device-to-device (D2D) communication (or proximity services (ProSe)), Internet of Things (IoT) communication, or dual connectivity (DC).

Furthermore, each of the general purpose base station 112 and the specialized base station 122 may transmit or receive a signal based on a CoMP method. Each of the base stations 112 and 122 may transmit or receive signals to or from the terminals 111 and 121 in a cell coverage thereof based on a CA method.

Signal transmission and reception methods of the general purpose base station 112 or the specialized base station 122 may be applied not only to a new radio (NR) communication system but also to other communication systems (for example, a Long Term Evolution (LTE) communication system, a 5G communication system, and a 6G communication system).

In order to efficiently use a wide frequency band, the NR communication system may support a system bandwidth, for example, a carrier bandwidth, which is wider than a system bandwidth provided by the LTE communication system. For example, a maximum system bandwidth supported by the LTE communication system may be 20 MHz. On the other hand, the NR communication system may support a carrier bandwidth of up to 100 MHz in a frequency band of 6 GHz or less and may support a carrier bandwidth of up to 400 MHz in a frequency band of 6 GHz or more.

In communication systems, for example, in the NR communication system, numerology applied to physical signals and channels may be varied. The numerology may be varied to satisfy various technical requirements of the communication system. In a communication system to which cyclic prefix (CP)-based orthogonal frequency division multiplexing (OFDM) waveform technology is applied, the numerology may include a subcarrier interval and a CP length (or a CP type).

Figure 4:
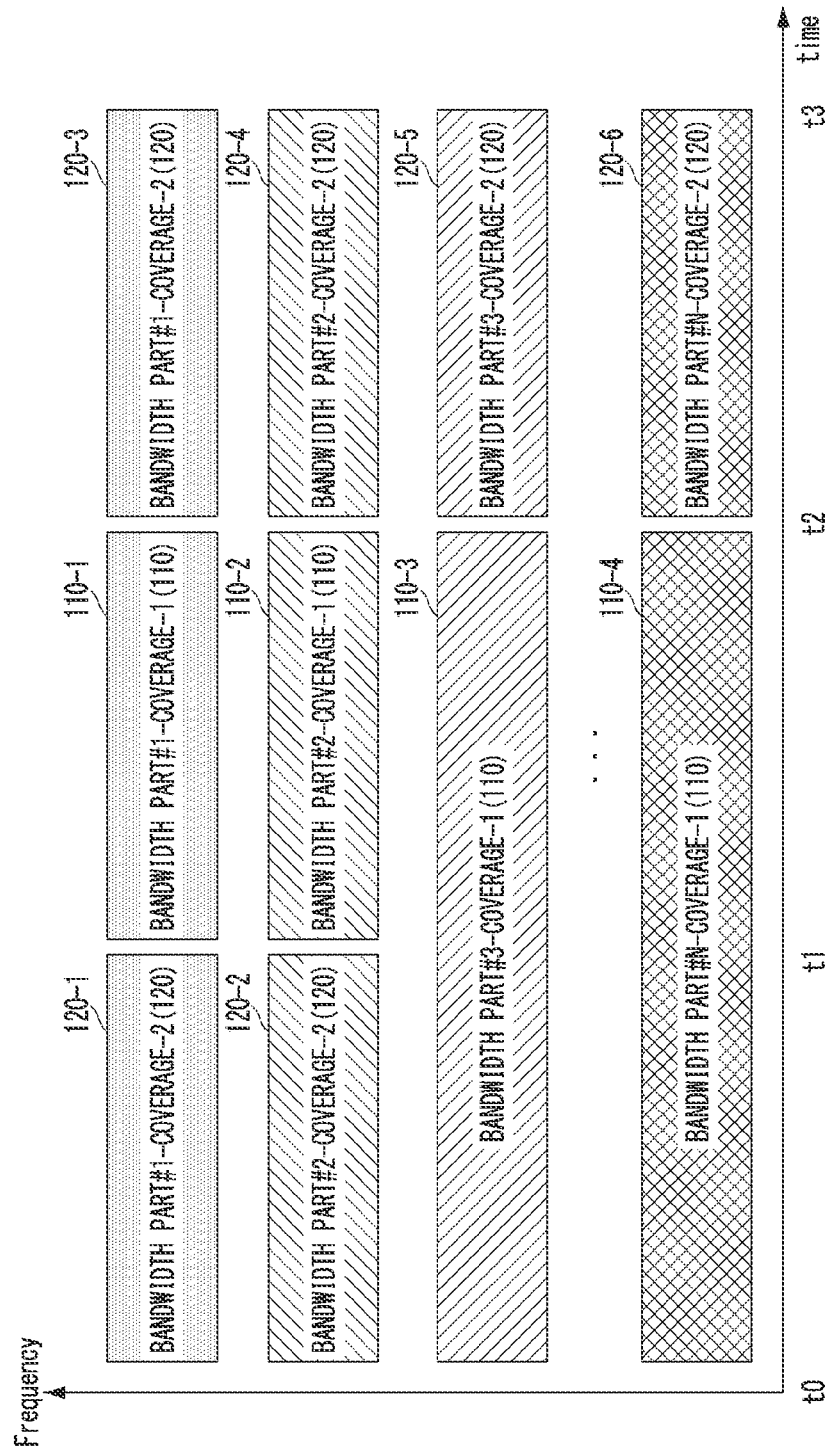
FIG. 4 is an exemplary diagram of bandwidth part allocation according to a frequency band division method of a first example embodiment in the network of FIG. 3.

FIG. 4 is an exemplary diagram of bandwidth part allocation according to a frequency band division method of a first example embodiment in the network of FIG. 3.

An apparatus for sharing a frequency between base stations in a specialized base station according to the present example embodiment (hereinafter, referred to simply as a "frequency-sharing apparatus") may divide frequencies used in a general purpose coverage and a specialized coverage in an overlapping network into bandwidth parts, thereby functioning to remove radio interference between the coverages.

More specifically, as shown in FIGS. 3 and 4, in the frequency-sharing apparatus, bandwidth part #1 120-1 (coverage-2) and bandwidth part #2 120-2 (coverage-2) may be used in the specialized coverage 120 managed by the specialized base station 122 from an initial time t0 to a first time t1, and bandwidth part #110-3 (coverage-1) to bandwidth part #N 110-4 (coverage-1) may be used in the general purpose coverage 110 managed by the general purpose base station 112, thereby providing a service without radio interference.

Meanwhile, since a separate specialized service is not required in the specialized coverage 120 managed by the specialized base station 122 from the first time t1 to a second time t2, a bandwidth part may not be used. In this case, the frequency-sharing apparatus may transmit relevant information to the mobile edge core network 130 and may share the relevant information with the core network 140 to operate such that the general purpose base station 112 uses all bandwidth parts, that is, bandwidth part #1 110-1 (coverage-1), bandwidth part #2 110-2 (coverage-1), bandwidth part #3 110-3 (coverage-1), and bandwidth part #N 110-4 (coverage-1).

In addition, the frequency-sharing apparatus may operate such that, from the second time t2 to a third time t3, in order to provide a service requiring very high quality of service, all bandwidth parts, that is, bandwidth part #1 120-3 (coverage-2), bandwidth part #2 120-4 (coverage-2), bandwidth part #3 120-5 (coverage-2), and bandwidth part #N 120-6 (coverage-2), may be used in the specialized coverage 120 managed by the specialized base station 122.

In the above case, the frequency-sharing apparatus that can be mounted on or coupled to the specialized base station 122 may operate to request all bandwidth parts from the mobile edge core network 130 and thus receive permission from the mobile edge core network 130 to use all the bandwidth parts, thereby providing a corresponding specialized service.

An operating state of the above-described specialized base station may be selectively implemented when there is no bandwidth part used by the general purpose base station 112. The allocation of bandwidth parts to the general purpose base station and the specialized base station may be determined through cooperation between the mobile edge core network 130 and the core network 140 according to an example embodiment.

Figure 5:
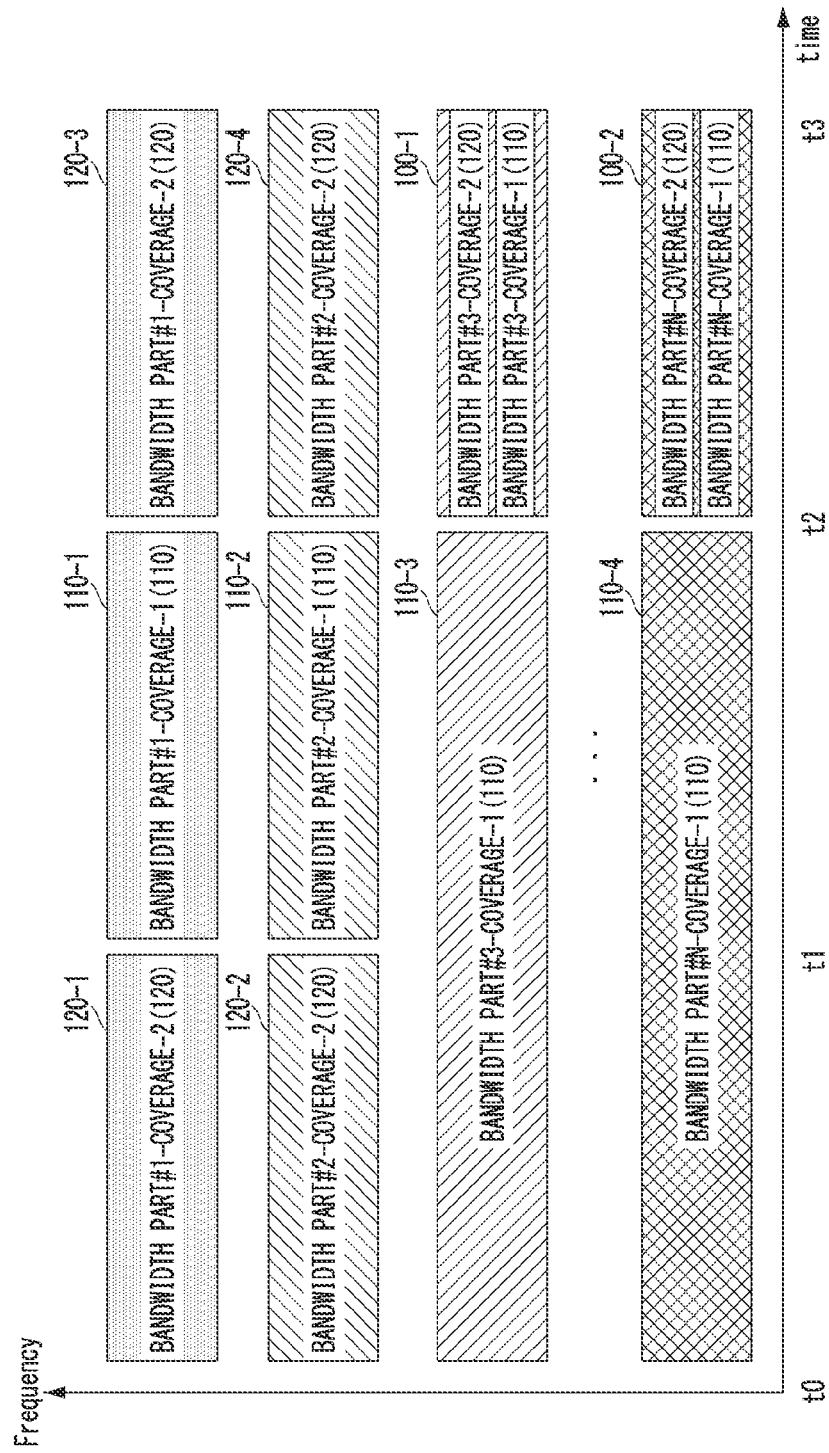
FIG. 5 is an exemplary diagram of bandwidth part allocation according to a frequency band division method of a second example embodiment in the network of FIG. 3.

FIG. 5 is an exemplary diagram of bandwidth part allocation according to a frequency band division method of a second example embodiment in the network of FIG. 3.

A frequency-sharing apparatus according to the present example embodiment may operate to divide frequencies used in a general purpose coverage and a specialized coverage in an overlapping network into bandwidth parts and share the bandwidth parts in some cases, thereby removing radio interference between coverages.

More specifically, as shown in FIGS. 3 and 5, the frequency-sharing apparatus may operate such that, from an initial time t0 to a first time t1, bandwidth part #1 120-1 (coverage-2) and bandwidth part #2 120_2 (coverage-2) are used in the specialized coverage 120 managed by the specialized base station 122, and bandwidth part #3 110-3 (coverage-1) to bandwidth part #N 110-4 (coverage-1) are used in the general purpose coverage 110 managed by the general purpose base station 112.

In addition, since a separate specialized service is not required in the specialized coverage 120 managed by the specialized base station 122 from the first time t1 to a second time t2, a bandwidth part may not be used. In this case, the frequency-sharing apparatus may transmit relevant information to the mobile edge core network 130 and may share the relevant information with the core network 140 to operate such that the general purpose base station 112 uses all bandwidth parts, that is, bandwidth part #1 110-1 (coverage-1), bandwidth part #2 110-2 (coverage-1), bandwidth part #3 110-3 (coverage-1), and bandwidth part #N 110-4 (coverage-1).

Meanwhile, in the specialized coverage 120 managed by the specialized base station 122, from the second time t2 to the third time t3, in order to provide a service requiring very high quality of service, more bandwidth parts may be required than before the second time t2.

In addition, based on a received signal level, a propagation path loss, a signal-to-noise ratio, or the like of the adjacent general purpose base station 112 and a specialized base station (not shown) measured by the specialized base station 122, it may be determined that an interference effect of a frequency band is less than a certain reference value or has a negligible level. In such a case, the frequency-sharing apparatus may operate such that the specialized base station 122 uses more bandwidth parts.

That is, the frequency-sharing apparatus may operate such that the specialized base station 122 uses all of bandwidth part #1 120-3 (coverage-2), bandwidth part #2 120-4 (coverage-2), bandwidth part #3 100-1 (coverage-2), and bandwidth part #N 100-2 (coverage-2) in the specialized coverage 120 from the second time t2 to the third time t3, and concurrently, the general purpose base station 112 uses bandwidth part #3 100-1 (coverage-1) and bandwidth part #N 100 (coverage-1) in the general purpose coverage 110 from the second time t2 to the third time t3. In this case, bandwidth part #3 100-1 to bandwidth part #N 100-2 are concurrently used in the same frequency band by the general purpose base station 112 and the specialized base station 122.

As described above, the frequency-sharing apparatus determines whether a specialized base station can use a bandwidth part based on a bandwidth part use state at each base station and a received signal level from an adjacent base station. The frequency-sharing apparatus may request information about bandwidth parts to be used in a specific time period from the mobile edge core network 130 and may receive permission from the mobile edge core network 130 to use some or all of the bandwidth parts, thereby functioning to very effectively provide a specialized service to a specialized terminal.

As described above, unlike FIG. 4, the frequency-sharing apparatus may be set or may function such that, from the second time t2 to the third time t3, the general purpose base station 112 uses bandwidth part #3 100-1 (coverage-1) to bandwidth part #N 100-2 (coverage-1), and concurrently, the specialized base station uses bandwidth part #1 120-3 (coverage-2), bandwidth part #2 120-4 (coverage-2), bandwidth part #3 100-1 (coverage-2), and bandwidth part #N 100-2 (coverage-2).

Unlike a case in which a general purpose base station and a specialized base station cannot use the same bandwidth part at the same time when levels of signals transmitted from an adjacent general purpose base station and a specialized base station are levels that cause radio interference, this can be applied when levels of signals transmitted from a general purpose base station and a specialized base station adjacent to each other are relatively low so that substantially no degradation in quality of service due to radio interference occurs.

Such determination may be made through cooperation between the mobile edge core network 130 and the core network 140 in consideration of a level of a signal that is measured by a specialized base station and is transmitted from an adjacent general purpose base station.

Figure 6:
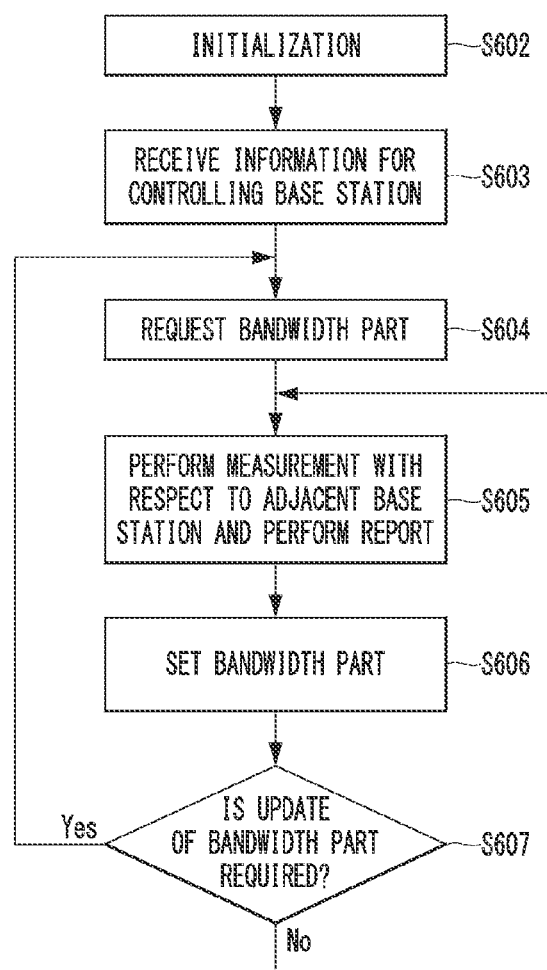
FIG. 6 is a flowchart for describing an operating principle of a method of sharing a frequency between base stations according to another example embodiment of the present disclosure.

FIG. 6 is a flowchart for describing an operating principle of a method of sharing a frequency between base stations according to another example embodiment of the present disclosure.

Referring to FIG. 6, after a specialized base station with a frequency-sharing apparatus performing a method of sharing a frequency between base stations mounted thereon or coupled thereto is initialized or turned on ("initialization" operation S602) to be constructed, the specialized base station receives control information from a mobile edge core network for controlling the specialized base station ("base station control information receiving" operation S603). In operation S603, the specialized base station may receive information about adjacent base stations through the mobile edge core network.

Distributed cloud computing technology applied to a traffic-and-service wireless base station to provide various services and caching content near a user terminal or a base station is known as technology for relieving traffic congestion and creating new local services, and may be referred to as a distributed cloud computing device, a distributed cloud platform, a distributed cloud server, a distributed mobile base station environment, or the like for processing or managing signals and data for a mobile edge core network in a narrow sense.

Next, the specialized base station requests a necessary bandwidth part from the mobile edge core network ("bandwidth part requesting" operation S604).

In addition, the specialized base station receives signals which are received from the mobile edge core network and are transmitted from adjacent base stations to measure, calculate, or extract a propagation path loss, a signal-to-interface-plus-noise ratio, received signal strength indicator (RSSI), channel quality indicator, and the like for each bandwidth part unit and report to the mobile edge core network ("adjacent base station measuring and reporting operation" S605).

Operation S605 may be performed before the previous operation S604 is performed, may be performed concurrently with the previous operation S604, or may be performed after the previous operation S604 is performed.

Then, the specialized base station receives determined bandwidth part information from the mobile edge core network and sets a bandwidth part of the specialized base station ("bandwidth part setting" operation S606).

Next, the specialized base station determines whether an update of the bandwidth part update (BWP update) is required to provide a specialized service ("bandwidth part update determining" operation S607).

When it is determined that the BWP update is required in operation S607 (Yes in S607), the specialized base station may return to the bandwidth part requesting operation S604 and repeat subsequent processes. In addition, when it is determined that the BWP update is not required in operation S607 (No in S607), the specialized base station may return to the adjacent base station measuring and reporting operation S605 and may measure signal levels of the adjacent base stations to report to the mobile edge core network and then may repeat subsequent processes.

An operating sequence of the above-described specialized base station is a simple example for describing the operation of the frequency-sharing apparatus of the present example embodiment, and a sequence of the above operations may be changed.

In addition, although the present example embodiment has been described based on the frequency-sharing apparatus mounted on or connected to the specialized base station, the present disclosure is not limited to such a configuration and may be implemented by a mobile edge core network with a frequency-sharing apparatus mounted thereon or connected thereto.

For example, a frequency-sharing apparatus that is mounted on or coupled to a mobile edge core network may perform a method including transmitting information about adjacent base stations including a general purpose base station to a specialized base station connected for a standardized service, receiving a message for requesting a necessary bandwidth part from the specialized base station, receiving a report of measured signal levels of the adjacent base stations from the specialized base station, and transmitting information for setting bandwidth parts of the specialized base station and the general purpose base station to the specialized base station or a core network of a general purpose network.

Figure 7:
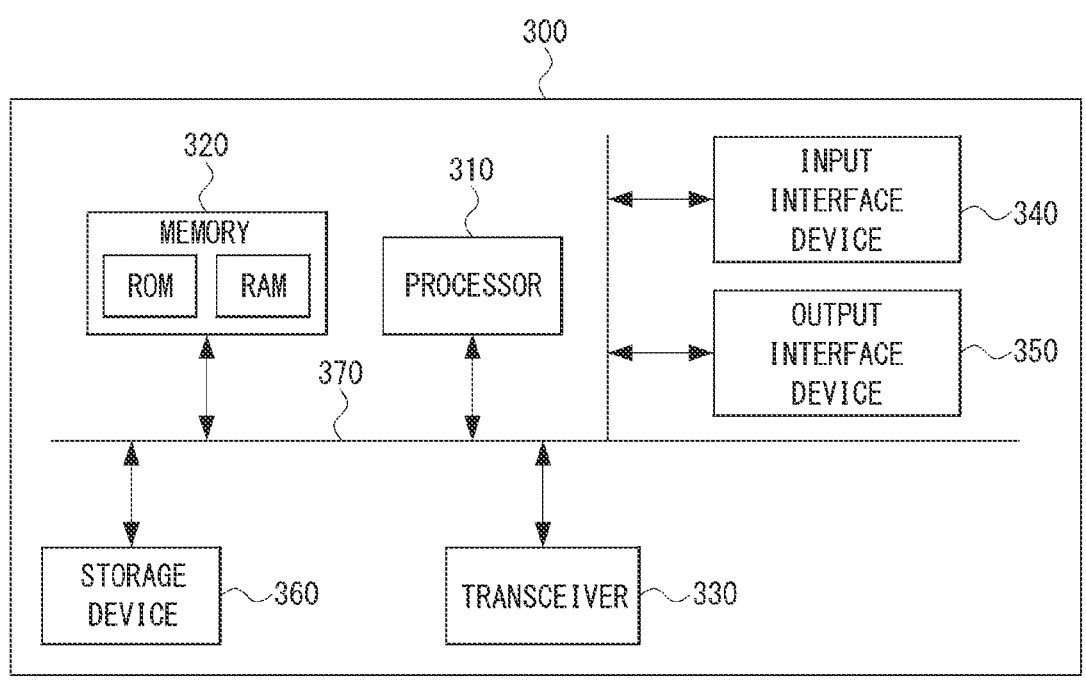
FIG. 7 is a block diagram for describing main components of a frequency-sharing apparatus according to another example embodiment of the present disclosure.

FIG. 7 is a block diagram for describing main components of a frequency-sharing apparatus according to another example embodiment of the present disclosure.

Referring to FIG. 7, the frequency-sharing apparatus may be connected to or mounted on a specialized base station. The frequency-sharing apparatus 300 may include at least one processor 310, a memory 320, and a transceiver 330 connected to a network to perform communication. In addition, the frequency-sharing apparatus 300 may further include an input interface device 340, an output interface device 350, a storage device 360, and the like. The components included in the frequency-sharing apparatus 300 may be connected through a bus 370 to communicate with each other.

The processor 310 may execute a program command stored in at least one of the memory 320 and the storage device 360. The processor 310 may be a central processing unit (CPU), a graphics processing unit (GPU), or a dedicated processor by which methods according to example embodiments of the present disclosure are performed.

Each of the memory 320 and the storage device 360 may be provided as at least one of a volatile storage medium and a non-volatile storage medium. For example, the memory 320 may be provided as at least one of a read only memory (ROM) and a random access memory (RAM).

The transceiver 330 may include a sub-communication system for supporting a wireless connection with a user terminal such as a specialized terminal, a sub-communication system for a wired or wireless communication link with a general purpose base station, or a sub-communication system for a connection such as an ideal backhaul link or a non-ideal backhaul link with a mobile edge core network. Here, the processor 310 may measure or calculate a signal-to-interface-plus-noise ratio, a received signal level, a propagation path loss, and the like through a measurement device included in the transceiver 330.

The input interface device 340 may include an input signal processing unit for processing or mapping a signal, which is input through at least one input device selected from input devices such as a keyboard, a microphone, a touch pad, and a touch screen, to a pre-stored command.

The output interface device 350 may include an output signal processing unit for mapping or processing a signal output under the control of the processor 310 as a pre-stored signal type or to a level, and at least one output unit for outputting a signal or information in the form of vibration, light, or the like according to a signal of the output signal processing unit. The at least one output unit may include at least one selected from output devices such as a speaker, a display device, a printer, an optical output device, and a vibration output device.

In addition, a program command executed by the processor 310 may include an initialization command, a command for receiving base station control information, a command for receiving a signal of an adjacent base station, a command for measuring a received signal level, a command for calculating received signal quality, a command for reporting measurement data to a mobile edge core network, a command for requesting a bandwidth part required by a specialized base station from the mobile edge core network, a command for receiving a response message from the mobile edge core network, a command for setting an allocated bandwidth part, a command for determining whether an update of a bandwidth part is required, a command for, when the update of the bandwidth part is required, shifting to an operation of requesting a bandwidth part, and a command for, when it is determined that the update of the bandwidth part is not required, shifting to an operation of measuring signal levels of adjacent base stations and reporting to the mobile edge core network.

In addition, in another aspect, the program command executed by the processor 310 may include a command for transmitting information about adjacent base stations including a general base station to a specialized base station connected for a specialized service, a command for receiving a message for requesting a necessary bandwidth part from the specialized base station and processing the received message, a command for allocating a bandwidth part to the specialized base station, and a command for sharing information about bandwidth part allocation with a specialized base station or a core network of the general purpose base station.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of sharing a frequency between base stations, which is performed by a specialized base station having at least some specialized coverages inside a general purpose coverage of a general purpose base station, the method comprising:
   receiving information about adjacent base stations including the general purpose base station from a mobile edge core network configured to manage the specialized base station;
   requesting, by the specialized base station, necessary bandwidth parts from the mobile edge core network;
   receiving allocation information for the bandwidth parts from the mobile edge core network; and
   setting the bandwidth parts based on the allocation information,
   wherein the specialized base station provides a specialized service to a specialized terminal in the at least some specialized coverages according to the set bandwidth parts.

2. The method of claim 1, further comprising receiving signals transmitted from the adjacent base stations and reporting at least one of a propagation path loss, a received signal strength indicator (RSSI), reference signal received power (RSRP), reference signal received quality (RSRQ), a signal-to-interface-plus-noise ratio (SINR), and a channel quality indicator (CQI), which are measured for each of bandwidth part units, to the mobile edge core network.

3. The method of claim 2, wherein, when it is determined that a signal measurement level measured in the specialized base station is not a level at which a signal to be transmitted from the specialized base station causes radio interference with the adjacent base stations in all bandwidth part units, the allocation information for the bandwidth parts includes information for allowing all the bandwidth parts to be used.

4. The method of claim 2, wherein, when it is determined that a signal measurement level measured in the specialized base station is not a level at which a signal to be transmitted from the specialized base station causes radio interference with the adjacent base stations in a specific bandwidth part, the allocation information for the bandwidth parts includes information about the specific bandwidth part shared by the specialized base station and the general purpose base station.

5. The method of claim 2, further comprising determining whether an update of a bandwidth part is required based on signal measurement values measured by the specialized base station,
wherein, when the update of the bandwidth part is not required, a process returns to measuring signals of the adjacent base stations.

6. The method of claim 1, further comprising determining whether an update of a bandwidth part is required based on signal measurement values measured by the specialized base station,
wherein, when the update of the bandwidth part is required, a process returns to the requesting of the necessary bandwidth parts.

7. A method of sharing a frequency between base stations, which is performed by a mobile edge core network configured to manage a specialized base station having at least some specialized coverages inside a general purpose coverage of a general purpose base station, the method comprising:
transmitting, by the mobile edge core network, information about adjacent base stations including the general purpose base station to the specialized base station connected for a specialized service;
receiving, by the mobile edge core network, a message for requesting necessary bandwidth parts from the specialized base station; and
transmitting, by the mobile edge core network, allocation information for the bandwidth parts of the specialized base station and the general purpose base station to the specialized base station,
wherein the specialized base station sets the bandwidth parts based on the allocation information for the bandwidth parts received from the mobile edge core network and provides a specialized service to a specialized terminal in the at least some specialized coverages according to the set bandwidth parts.

8. The method of claim 7, further comprising receiving, by the mobile edge core network, signals transmitted from the adjacent base stations and receiving a report of at least one of a propagation path loss, a received signal strength indicator (RSSI), reference signal received power (RSRP), reference signal received quality (RSRQ), a signal-to-interface-plus-noise ratio (SINR), and a channel quality indicator (CQI), which are measured for each of bandwidth part units, from the specialized base station.

9. The method of claim 8, wherein, when it is determined that a level of a signal to be transmitted from the specialized base station is not a level which causes radio interference with the adjacent base stations in all bandwidth part units based on measurement information acquired in the receiving of the report, the allocation information for the bandwidth parts includes information for allowing all the bandwidth parts to be used.

10. The method of claim 8, wherein, when it is determined that a level of a signal to be transmitted from the specialized base station is not a level which causes radio interference with the adjacent base stations in a specific bandwidth part based on measurement information acquired in the receiving of the report, the allocation information for the bandwidth parts includes information about the specific bandwidth part shared by the specialized base station and the general purpose base station.

11. An apparatus for sharing a frequency between base stations, which is mounted on or coupled to a specialized base station having at least some specialized coverages inside a general purpose coverage of a general purpose base station to perform a method of sharing a frequency between base stations, the apparatus comprising:
a processor; and
a memory configured to store a program command executed by the processor,
wherein, when the program command is executed by the processor, the program command is executed such that the processor performs:
receiving information about adjacent base stations including the general purpose base station from a mobile edge core network configured to manage the specialized base station;
requesting, by the specialized base station, necessary bandwidth parts from the mobile edge core network;
receiving allocation information for the bandwidth parts from the mobile edge core network; and
setting the bandwidth parts based on the allocation information,
wherein the specialized base station provides a specialized service to a specialized terminal in the at least some specialized coverages according to the set bandwidth parts.

12. The apparatus of claim 11, wherein the processor further performs receiving signals transmitted from the adjacent base stations and reporting at least one of a propagation path loss, a received signal strength indicator (RSSI), reference signal received power (RSRP), reference signal received quality (RSRQ), a signal-to-interface-plus-noise ratio (SINR), and a channel quality indicator (CQI), which are measured for each of bandwidth part units, to the mobile edge core network.

13. The apparatus of claim 12, wherein:
the processor further performs determining whether an update of a bandwidth part is required based on signal measurement values measured by the specialized base station; and
when the update of the bandwidth part is not required, the processor returns to measuring signals of the adjacent base stations.

14. The apparatus of claim 12, wherein:
the processor further performs determining whether an update of a bandwidth part is required based on signal measurement values measured by the specialized base station; and
when the update of the bandwidth part is required, the processor returns to the requesting of the necessary bandwidth parts.

15. The apparatus of claim 11, wherein the mobile edge core network includes a network connected to a core network configured to manage the general purpose base station.

* * * * *